L. ST. C. BRACH.
NUT LOCK.
APPLICATION FILED SEPT. 26, 1908.
940,503.
Patented Nov. 16, 1909.
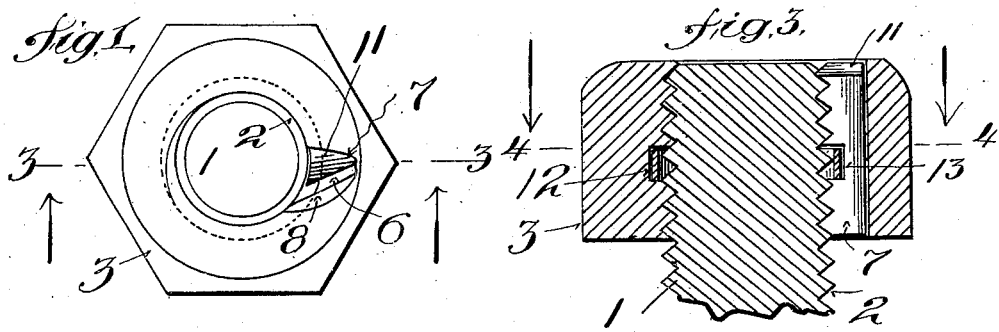
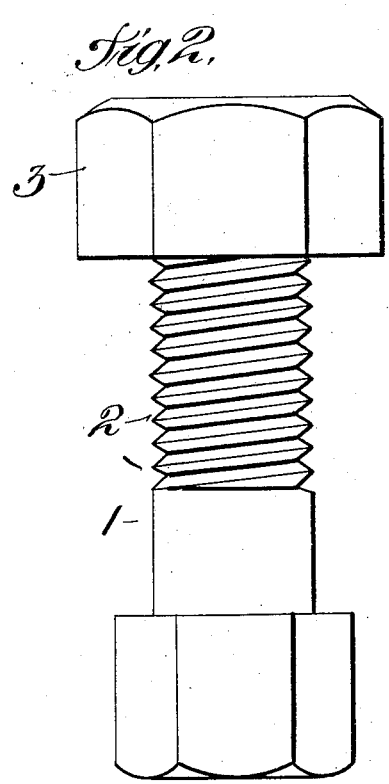
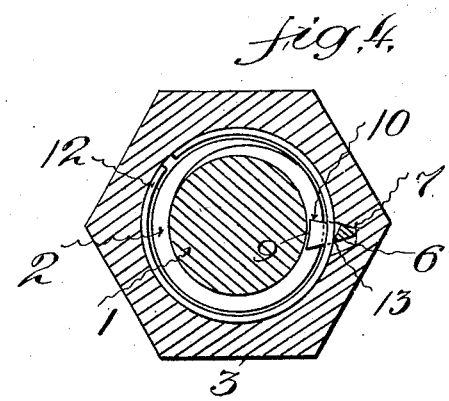
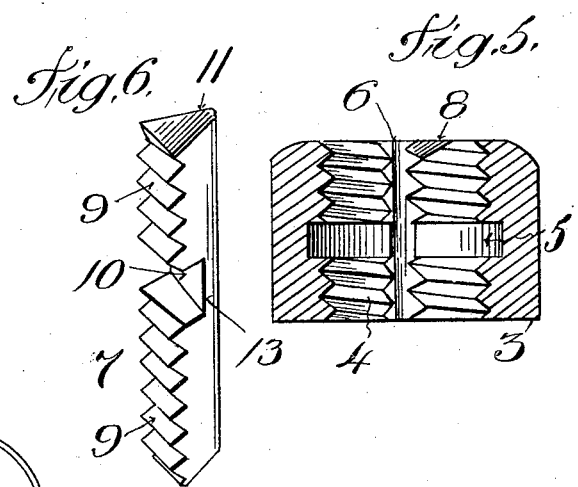
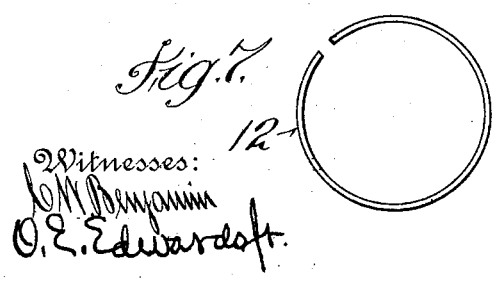
Witnesses:
Inventor
Leon St Clair Brach
By his Attorney Benjamin H. Stern

UNITED STATES PATENT OFFICE.

LEON ST. CLAIR BRACH, OF NEW YORK, N. Y., ASSIGNOR, BY MESNE ASSIGNMENTS, TO THE UNITED STATES LOCK-NUT COMPANY, A CORPORATION OF NEW YORK.

NUT-LOCK.

940,503.  Specification of Letters Patent.  Patented Nov. 16, 1909.

Application filed September 26, 1908. Serial No. 454,907.

*To all whom it may concern:*

Be it known that I, LEON ST. CLAIR BRACH, a citizen of the United States, and a resident of the city, county, and State of New York, have invented a new and useful Improvement in Nut-Locks, of which the following is a specification.

The object of my invention is to provide a nut lock of the class provided with a thread engaging pawl held in the nut and engaging the threads of the bolt. This object is accomplished by my invention which improves both the pawl and the means for holding the same in the nut as well as the nut, so that the pawl will more positively engage the threads of the bolt, and my invention also includes means for permitting the nut to be more readily removed when desired.

For a more particular description of my invention, reference is to be had to the accompanying drawings forming a part hereof, in which—

Figure 1 is a plan view of my improved nut lock. Fig. 2 is a side elevation of a bolt and nut provided with the same. Fig. 3 is a sectional view taken on the line 3—3 of Fig. 1. Fig. 4 is a sectional view taken on the line 4—4 of Fig. 3. Fig. 5 is a sectional view of my improved nut. Fig. 6 is a perspective view of the pawl. Fig. 7 is a view of the ring.

Throughout the various views of the drawings similar reference characters designate similar parts.

A bolt 1 is provided with the threads 2 and a nut 3 is fitted thereon which is provided with corresponding threads 4 and annular groove 5 and a vertically disposed slot 6 for a pawl 7, as well as a bevel 8 adjacent to the slot 6 for a purpose that will appear below.

The pawl 7 is provided with threads 9 which are uniform or substantially uniform with the threads 4 and a slot 10 adapted to register with the annular groove 5 in the nut 3. The outer end of the pawl 7 is beveled at 11 so as to form a groove with the bevel 8 when the pawl 7 is in the slot 6. This pawl 7 is held loosely in place by means of a ring 12 which fits in the annular groove 5 and slot 10 and prevents the pawl 7 from leaving the nut 3, as shown in Figs. 4 and 6. The groove 10 is deeper at one side of the pawl 7 than at the other, so as to form an edge 13 at one side against which the ring 12 presses, thereby tending to rotate the pawl about its outer edge as an axis, thereby causing the threads 9 of the pawl 7 to more positively engage the threads 2 of the bolt 1.

The operation of my device is as follows: The pawl 7 is first placed in the slot 6 so that its threads 9 are uniform with the threads 4 of the nut 3. The spring ring 12 is then sprung in place in the annular groove 5 and slot 10, thereby holding the pawl in place and pressing against the edge 13. The nut 3 may then be placed upon the bolt 1 in the usual manner. The pawl 7 will not oppose the turning of the nut 3 on the bolt 1 as the nut is tightened. Any loosening of the nut is prevented by the pawl 7 which under the action of the spring ring 12 immediately grips and locks with the threads 2. If the spring ring 12 were omitted, the bolt 1 could be turned in the nut 3 while the latter is held in a certain position and the bolt could then be removed from the nut without difficulty. The use of the ring 12 renders such a removal an impossibility. However, the nut 3 can be removed with the ring 12 in place by inserting an instrument between the pawl 7 and slot 6 whereby the pawl 7 is rendered inoperative, or the same result may be obtained in a similar manner by inserting an instrument against the bevels 8 and 11, whereby the same result is accomplished.

From the foregoing it is obvious that my improved nut lock, will, under all circumstances, positively prevent the loosening of the nut on the bolt. Moreover, it provides means for securing the pawl in place at all times whether the nut is on a bolt or not, and it also provides means which facilitate the removal of the nut from a bolt.

While I have shown and described one embodiment of my invention, it is evident that it is not restricted thereto, but is broad enough to cover all structures that come within the scope of the annexed claims.

What I claim is:

1. In a device of the class described, a nut, a slot and an annular groove in said nut and near the center of the same, a pawl in said slot and means in said groove for holding said pawl in place.

2. In a device of the class described, a nut, a slot in said nut, an annular groove in said nut, a pawl in said slot and means in said groove for securing said pawl in said slot and forcing the same into the engagement with the threads of a bolt when the bolt is inserted in the nut or the nut is placed on a bolt.

3. In a device of the class described, a nut, a slot in said nut, an annular groove in said nut, a pawl with a slot registering with said groove and a ring in said groove and slot whereby the nut and pawl are held in their proper relations.

4. In a device of the class described, a nut, a slot in said nut, a groove in said nut, a pawl in said slot provided with a slot registering with said groove and provided with an inclined bottom and a spring ring in said groove and slot in said pawl and resting against one edge of the slot in said pawl, so that said pawl will be spring pressed against the threads of a bolt when in use and prevent loosening of the nut on the bolt.

In witness whereof, I have signed my name to this specification in the presence of two subscribing witnesses.

LEON ST. CLAIR BRACH.

In presence of—
RALPH KIRBY,
C. H. STODDARD.